United States Patent [19]

Kiraly et al.

[11] Patent Number: 6,042,665
[45] Date of Patent: Mar. 28, 2000

[54] PROCESS FOR THE PRODUCTION OF GYPSUM-BASED COMPOSITE BOARDS AND SHAPED BODIES

[76] Inventors: Bela Kiraly, Andor ut 14., H-1119, Budapest; Jozsef Hadnagy, Szasz K. ut 2-4., H-1027, Budapest; Peter Szabo, Viola ut 20., H-2800, Veszprem; Zoltan A. Juhasz, Szolo koz., H-1032, Budapest, all of Hungary

[21] Appl. No.: 09/117,826
[22] PCT Filed: Feb. 16, 1996
[86] PCT No.: PCT/HU96/00008
    § 371 Date: Aug. 7, 1998
    § 102(e) Date: Aug. 7, 1998
[87] PCT Pub. No.: WO97/30007
    PCT Pub. Date: Aug. 21, 1997
[51] Int. Cl.$^7$ .............................. B28B 1/52; C04B 28/14
[52] U.S. Cl. .............................. 156/39; 106/772; 264/333
[58] Field of Search ...................... 106/772, 638, 106/423, 783, 784, 785, 786; 156/39, 42; 264/333

[56] References Cited

U.S. PATENT DOCUMENTS

| 4,213,931 | 7/1980 | Trutnev et al. | 264/234 |
| 4,840,688 | 6/1989 | Vogt | 156/39 |
| 5,015,449 | 5/1991 | Kosolowski | 423/172 |
| 5,041,333 | 8/1991 | Conroy | 428/312.4 |

*Primary Examiner*—Jeff H. Aftergut
*Attorney, Agent, or Firm*—Keil & Weinkauf

[57] ABSTRACT

Gypsum-based composite boards or shaped bodies can be manufactured from a mixture comprising calcium sulfate dihydrate and water, and optionally reinforcement materials or fillers, and conventional additives, by shaping the mixture to a raw form and hardening the raw form with water at a pressure exceeding the saturation pressure of calcium sulfate dihydrate.

20 Claims, No Drawings

PROCESS FOR THE PRODUCTION OF GYPSUM-BASED COMPOSITE BOARDS AND SHAPED BODIES

The invention relates to a process for the production of composite boards and shaped bodies, totally consisting of gypsum or gypsum mixed with reinforcement materials and fillers. Instead of the commonly known calcium sulfate hemihydrate ($CaSO_4 \times \frac{1}{2} H_2O$; hereinafter hemihydrate), calcium sulfate dihydrate ($CaSO_4 \times 2 H_2O$; hereinafter dihydrate) is used as base material in the process according to the invention.

For the production of gypsum-based composite boards essentially methods of two kinds are known [P. Takács: Faipar (in English: "Woodworking Industry") 8, 140–149 (1993)]. According to one of these, hemihydrate being the base material of the process is produced from dihydrate in a separate gypsum-calcinating furnace. This binding material is mixed with water required for the hardening of hemihydrate, fillers and reinforcement materials as well as other conventional additives. A mat is formed from the mixture, which is then pressed. During compression the gypsum hardens and the board is formed out. The moisture content of the product is adjusted by an artificial final drying. The process is called as wet, half-dry or dry process, depending on the amount of water used for mixing-in as well as the technological site and time of water addition.

According to the other method, a dihydrate flour is utilized as base material. A suspension is prepared from dihydrate, fillers and reinforcement materials, other conventional as well as water. Therefrom, a mat is first prepared, which is then dehydrated. Dihydrate forming the main constituent of the mat is first calcinated (dehydrated) in a heat-press or autoclave, then the hemihydrate obtained is rehydrated with water at the same place, simultaneously with the decrease in temperature and pressure conditions. The moisture content of the hardened board is adjusted similarly by a final drying.

There exists no difference in the basic principle of these traditional techniques. Each of them is based on the dehydration and rehydration of gypsum known for several hundreds of years. The basic principle is not altered by carrying out the procedures of crystal water loss and re-incorporation (de- and rehydration) in a single step or several steps, respectively.

Thus, as it is known e.g. from the German published patent application No. 34 19558 A1, the processes of dehydration and rehydration are carried out in the same autoclave. In this process, an aqueous suspension is prepared from a mixture containing finely ground dihydrate, a fibrous material (e.g. waste paper fibres) in an amount of not more than 10% by weight as well as substances controlling the hardening. After being applied onto an endless screen belt, the dilute slurry-like suspension is dehydrated to a moisture content of less than 40% by weight in a belt press by the simultaneous use of vacuum and pressure. After cutting the endless mat to the desired size, the raw boards are first calcinated in an autoclave, then rehydrated, in a single run. The temperature of the autoclave is adjusted first to 135–145° C., then below 100° C. to transform the hemihydrate formed again to dihydrate. The temperature of 142° C. and pressure of 4 bar defined in an example of the description is one point of the saturated vapour curve.

Other known processes may be considered to be the further developed variants of the former basic conception. Thus, e.g. according to the European published patent application No. 0 173 351 A2, a difference consists only in that the hemihydrate is prepared in a heat-press but not in an autoclave. It appears from the European published patent application No. 0 309 709 A1 that in the first step the boards are calcinated at 100–170° C. under atmospheric pressure in an autoclave, then they are hardened, i.e. rehydrated, with water at the same place. The process according to European published patent application No. 0 294 566 A1 is a further example of diminishing the drawbacks of former processes; according to this water containing also hardening-accelerators is let flow through the calcinated boards.

As the most important disadvantages of the known processes, it can be noted that a significant energy loss occurs because of the repeated heating of equipments of large weight; furthermore, the de- and rehydration processes may last for several hours.

Thus, the present invention is aimed to produce from dihydrate gypsum-comprising composite boards and shaped bodies with favourable technological parameters by eliminating the drawbacks of former processes, beside lower investment and manufacturing costs.

The invention is based on the recognition that during the transformation taking place under pressure/temperature defined hereinafter, the dihydrate being the base material, consisting of separate crystals, recrystallizes [the crystals "join in growing" (coalesce), their size increases, their form is changed] and forms a gypsum-matrix [which is the base of formation of any gypsum-based artificial stone] without undergoing any de- and rehydration process.

Thus, according to our recognition, the condition of transformation lies therein that the pressure of the medium surrounding the dihydrate should be higher than the partial vapour pressure of dihydrate. On comparison to the traditional processes, the significant difference consists in that the traditional processes are carried out according to the pressure/temperature function of the saturation vapour pressure or under a lower pressure; whereas, according to the present invention the process is carried out above the saturation vapour pressure, preferably according to the pressure/temperature function of the dihydrate or even under higher pressures. The term "pressure" is meant to be the pressure inside the board or shaped body. This condition has not been realized in any of the former processes; therefore, the recrystallization according to the invention cannot take place therein even temporarily. The summarizing handbook entitled "Gmelins Handbuch der Anorganischen Chemie" [Vol. 8, No. 28, Part 1; Verlag Chemie/Weinheim (1961)] contains nearly all basic data relating to the chemistry of gypsum. It appears from this handbook that a number of researchers [e.g. Van't Hoff (1900) as well as Toriumi (1938)] investigated the determination of the constitutional diagram of gypsum. The basic data occurring here are being used in a wide range at present, too. All researchers studied only the state changes of dihydrate occurring at a pressure below the pressure/temperature function curve; the part above this function curve was not investigated because the dihydrate was considered to be in equilibrium state in this region.

Thus, the invention relates to a process for the production of gypsum-based composite boards and shaped bodies from a mixture of calcium sulfate dihydrate and water, optionally further comprising reinforcement materials or fillers or conventional additives. The process according to the invention comprises hardening the mixture by water having a pressure exceeding the saturation vapour pressure.

A practical embodiment of process according to the invention is accomplished as follows.

In order to achieve the appropriate crystal forms, compounds containing sulfates, e.g. aluminum sulfate, may be used as additives which, in addition to shaping out a more favourable crystal structure of gypsum, accelerate the recrystallization process, too.

The reinforcement materials or fillers are native or artificial. They are designed to the reinforcement of products prepared by using the process of the invention and may be either of organic origin (preferably chips, cellulose fibres, synthetic filaments) or inorganic origin (preferably glass fibres, carbon fibres). The reinforcement materials or fillers are fibrous or granular materials endowing the products with more favourable parameters. The reinforcement materials or fillers also relates to a group of materials, by the mixing-in of which the material costs can be diminished. The transformation process is not bound to the condition of presence of reinforcement materials or fillers or conventional additives; in addition, these are known materials [G. Kühne: Baustoffindustrie 2, 40–46 (1989)].

In the process according to the invention, the pressure, being the function of the temperature, has no theoretical but technical limits. By elevating the temperature by 20–30° C. the time of treatment can be decreased to a fraction thereof; however, due to the necessity of a nearly exponential increase in the pressure, robust equipments with too large weight would be to be employed at high temperatures. Thus, it is unsuitable to increase the temperature above 180° C.

According to the demands of utilization, the parameters of products produced by using the process according to the invention can be varied within a wide range. Thus, e.g. both a light product with a density of 900 kg/m$^3$ and a bending strength of 5 MPa as well as a product with a density of 1400 kg/m$^3$ with a strength of 3 times as high as that of the former one, may be produced.

One of the fields of preferred utilizations of the invention is represented by the techniques of the gypsum-based board manufacturing. This can be achieved on the plant-like working production line designed to the manufacturing of carbondioxide-hardened cement boards (M. Tompa: UNITED NATIONS TIM/SEM, 1991/14 R5). The base material of reinforcement materials or fillers should be chopped, torn to the fibres thereof in the traditional manner. Paper waste is the most frequently used one of such materials. Optionally, the ground dihydrate is mixed together in an agitator with the optional additives, obligatorily with reinforcement materials or fillers as well as with a small amount of water needed to adhesion and plastification. A mat is formed from the mixture. The principles of mat formation do not differ from the usual ones. The mat formation is carried out on a sectioned screen. The mat together with the screen gets to the unheated, one-level hydraulic press of large board size, closing along the edges, too. The plates of press are provided with bores perpendicular to the plate plane for introducing and leading out hot water. After closing the press, the board is pressurized with hot water through these bores. The gypsum-matrix is formed out, the board hardens within a short period. Subsequently, the water is emptied through the bores mentioned, then the press is opened. The hot boards coming from the press are transferred to the final dryer. After this, edging and packaging only remain. There is no additional hardening. The hot water flowing out is utilized as mixing water for the next boards; thus, no waste water is formed. During the process, gypsum is present in its dihydrate state in any moment. The system of the press and other technical equipments and mode of heat-transfer may be varied depending on the demand.

An other significant field of utilizing the process according to the invention is represented by the production of gypsum-based building blocks and shaped bodies.

Traditionally, the blocks are produced by mixing the calcinated gypsum (hemihydrate) with water and pouring the slurry into a mould, where it hardens and can be removed from the mould. Subsequently, the excess moisture is removed by drying. Any process for manufacturing gypsum blocks by the direct utilization of dihydrate as base material was till now unknown.

An other embodiment of the process according to the invention comprises forming a suspension from ground dihydrate, water and granular additives and heating them above 100° C. in an autoclave. The hot mixture is carried into a closed mould by further enhancement of the pressure. Due to the partial pressure above the equilibrium pressure of dihydrate, the substance recrystallizes, hardens, i.e. forms a gypsum-matrix while cooling. The shaped bodies cooled down are removed from the mould and the excess moisture is removed by drying.

The process according to the invention provides the following technical and economical advantages in comparison to the wet, half-dry and dry processes of board manufacturing.

It is unnecessary to calcine gypsum representing 70–80% of the weight of gypsum fibre boards but ground gypsum stone can be used without any pretreatment.

Not only a ground gypsum stone flour but also chemical and waste-gas gypsum (REA) as well as gypsum moulds of ceramic industry unuseful for re-utilization are suitable for using in the process of the invention. Waste-gas gypsum is most useful to this purpose because, due to its perfect particle structure, it can be used without any pretreatment (briquetting, drying, calcinating, grinding). The waste-gas gypsum forms have a higher dihydrate content and a board of higher strength can be produced therefrom.

Lower power expenditures are necessary for grinding the gypsum-stone (in the cases of gypsum moulds and mineral gypsums), which is accompanied by less technical problems.

The coarse and ground gypsum-stone, wastegas gypsum can be stored even at an uncovered place. The rain precipitation and freezing do not induce any alteration therein, nor induce any hardening process as e.g. in the case of calcined gypsum or cement. The storability of dihydrate is unrestricted.

A mixture prepared with reinforcement materials or fillers as well as water can also be stored for an unrestricted period in opposition to the wet technological processes, wherein the hardening begins at the moment of adding water and cannot be stopped. In the case of breakdown, particularly in the techniques using belt press or clamping device systems, the mixture hardens in the agitator [P. Takáts: Faipar 8, 140–149 (1993)]. In the process according to the invention the hardening begins only in the press.

The total amount of waste material from edging and faulty rejected boards can be recycled; therefore, no waste is formed. The techniques are fully unharmful to the environment.

Normally, extracted substances dissolved from the wood and other aggregates disturb the hardening of gypsum or cement. In the case of the process of the invention this does not mean any problem since they cannot exert a harmful effect in this medium and even promote the development of a favourable crystal structure.

The total investment of the gypsum-calcinating furnace can be saved, which represents about 30–40% of the total investment costs (calcinating furnace and board production line) for a complex technological process.

The total heat demand (about 1200 MJ/ton) and electric power demand (about 30 kW/ton of hemihydrate) of the calcinating furnace are left out. During heat-pressing, the heat used to warm up the boards and to cover heat losses are required. During transformation, the heat used to warm up the boards are only to be invested since the transformation per se is neutral. Only a small fraction of the heat allocated to calcination of gypsum is required for the heat-pressing.

A smaller plant building is required. The techniques according to the invention demand less space than the traditional ones since the space demand of the equipments is less and the calcinating furnace is unnecessary. The major part of the techniques can be composed of previously developed and widely used equipments.

Smaller dryers and less heat are required because the board leaving the press gets as hot to the dryer; therefore, the heat required to warm up the board can be saved.

On comparison to the dihydrate-based board manufacturing processes, the process according to the invention possesses further advantages as follows.

In the former processes the time of re- and dehyration may last several hours; this is decreased to a few (2–10) minutes in the process based on the principle of recrystallization.

Due to the repeated heatings and coolings of large-weight equipments, stresses can develop in the equipments and much energy gets lost in the course of these procedures. In the process according to the invention the cooling-back of the equipments is unnecessary.

Due to the long-lasting treatment, substances inhibiting the hardening process are dissolved from the skeleton material (e.g. waste paper). This problem does not occur in the process according to the invention.

The process according to the invention is illustrated in more detail by the following non-limiting Examples.

EXAMPLE 1

The Techniques of Board Manufacturing

A homogeneous mixture is formed from 0.2 part by weight of waste paper chopped to fibres, 1 part by weight of dihydrate flour of sieve fraction below 0.2 mm, 0.2 part by weight of water and 0.001 part by weight of aluminum sulfate. From this mixture, a mat of nearly 5 cm thickness is formed on a sectioned screen. The mat enters the press together with the screen. After closing the press, water with 1.4 MPa pressure and 160° C. temperature is pressed into the board through the bores perpendicular to the board plane for 5 minutes. At the end of the pressing period, the inner pressure of board is diminished down to the atmospheric pressure through the above bores and the press is opened. Then, the ready boards are dried in a board-dryer to a moisture content of nearly 3% by weight. Parameters of the final product are: a bending strength of 8 MPa and density of 1150 kg/m$^3$.

On comparison of the process described in above Example 1 to the process known from the German published patent application No. 34 19558 A1, a product with nearly the same parameters is prepared from a mixture of materials with nearly the same composition by input of energy being less by an order of magnitude. This is due to the fact that, in the process of invention, no equipment of large weight is heated to a working temperature and cooled down below 100° C. in each working cycle. The parameters are also significantly different. On operating both equipments e.g. at 160° C., saturated vapour with 0.63 MPa pressure is introduced to the autoclave for nearly 2 hours in the process used for comparison; whereas hot water with 1.4 MPa pressure is used for 5 minutes in the process according to the invention.

EXAMPLE 2

Techniques of the Shaped Body Manufacturing

A mixture is prepared from 1 part by weight of dihydrate flour, 0.6 part by weight of water and 0.01 part by weight of aluminum sulfate and heated up to 170° C. in an autoclave. The hot mixture is filled into a closable mould and a pressure of 1.7 MPa is established there by diminishing the inner volume of mould. While cooling down within about 10 minutes, the product hardens. The mould can be opened at 100° C. and the shaped body can be removed. Then, the shaped body is airdried. Parameter of the product is a density of 900 kg/m$^3$.

What is claimed is:

1. A process for the production of a gypsum-based composite board or shaped body from a mixture comprising calcium sulfate dihydrate and water, which comprises
   a) shaping the mixture to give a raw form, and
   b) hardening the raw form by treating it with water at a pressure exceeding the saturation vapor pressure of the dihydrate (3/17).

2. The process of claim 1, wherein the raw form is hardened at a temperature of from 110° C. to 200° C.

3. The process of claim 1, wherein the calcium sulfate dihydrate is a dihydrate sieve fraction below 0.2 mm.

4. The process of claim 1, wherein the calcium sulfate dihydrate is selected from the group consisting of mineral flour, chemical gypsum wastes and mixtures thereof.

5. The process of claim 1 for the production of a composite board, which comprises
   a) shaping the mixture to give a mat, and
   b) hardening the mat in a press.

6. The process of claim 1 for the production of a shaped body, which comprises
   $a_1$) preparing the mixture in form of a dihydrate suspension,
   $a_2$) preheating the dihydrate suspension, and
   $a_3$) filling the preheated suspension into a closable mould,
   b) hardening the preheated suspension in the closed mould, and cooling down the hardened suspension in the closed mould.

7. The process of claim 6, wherein the cooling down is effected within a period shorter than one hour.

8. The process of claim 6, wherein the cooling down is effected within a period of from 2 to 10 minutes.

9. The process of claim 1, wherein the mixture further comprises one or more compounds containing sulfate.

10. The process of claim 1, wherein the mixture further comprises aluminum sulfate.

11. The process of claim 1, wherein the mixture further comprises one or more reinforcement materials or fillers.

12. The process of claim 11, wherein the mixture comprises the reinforcement material or filler and the dihydrate in a weight ratio of from 0 to 0.35.

13. The process of claim 11, wherein the reinforcement material or filler is in a fibrous or granular form.

14. The process of claim 11, wherein the reinforcement material or filler is selected from the group consisting of cellulose fibres, synthetic filaments, glass fibres and carbon fibres.

15. The process of claim 11, wherein the mixture further comprises one or more compounds containing sulfate.

16. The process of claim 11, wherein the mixture further comprises aluminum sulfate.

17. The process of claim 11, wherein the mixture comprises the reinforcement material and the dihydrate in a weight ratio of from 0.1 to 0.25.

18. The process of claim 1, wherein the raw form is hardened at a temperature of from 130° C. to 180° C.

19. The process of claim 1, wherein the calcium sulfate dihydrate is a dihydrate sieve fraction below 0.05 mm.

20. The process of claim 1, wherein the calcium sulfate dehydrate is selected from the group consisting of waste-gas gypsum, phosphorogypsum, gypsum mould flour of ceramic industry and mixtures thereof.

* * * * *

UNITED STATES PATENT AND TRADEMARK OFFICE
CERTIFICATE OF CORRECTION

PATENT NO. : 6,042,665
DATED : March 28, 2000
INVENTOR(S) : Kiraly et al.

It is certified that error appears in the above-indentified patent and that said Letters Patent is hereby corrected as shown below:

Column 8, claim 20, line 2, change "dehydrate" to --dihydrate--.

Signed and Sealed this

Sixth Day of March, 2001

Attest:

NICHOLAS P. GODICI

Attesting Officer

Acting Director of the United States Patent and Trademark Office